Feb. 17, 1931.   H. C. HARRISON   1,792,536
SOUND RADIATOR
Filed Nov. 19, 1928   4 Sheets-Sheet 1
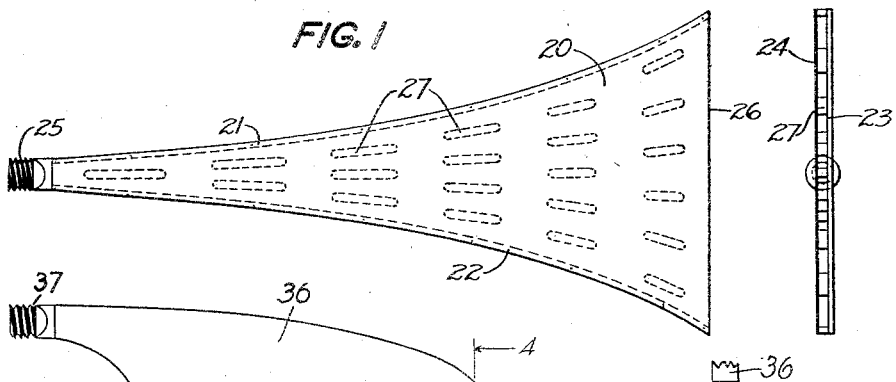
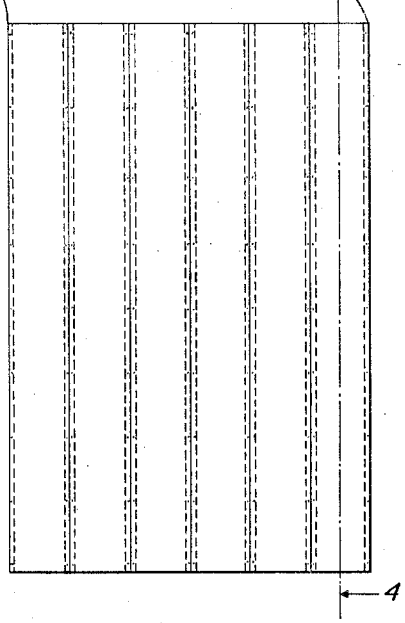
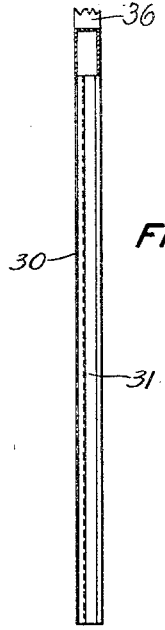
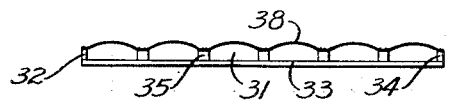
INVENTOR
*H. C. HARRISON*
BY
*G. H. Stevenson*
ATTORNEY Feb. 17, 1931.    H. C. HARRISON    1,792,536
SOUND RADIATOR
Filed Nov. 19, 1928    4 Sheets-Sheet 2

INVENTOR
*H. C. HARRISON*
BY
*G. H. Stevenson*
ATTORNEY

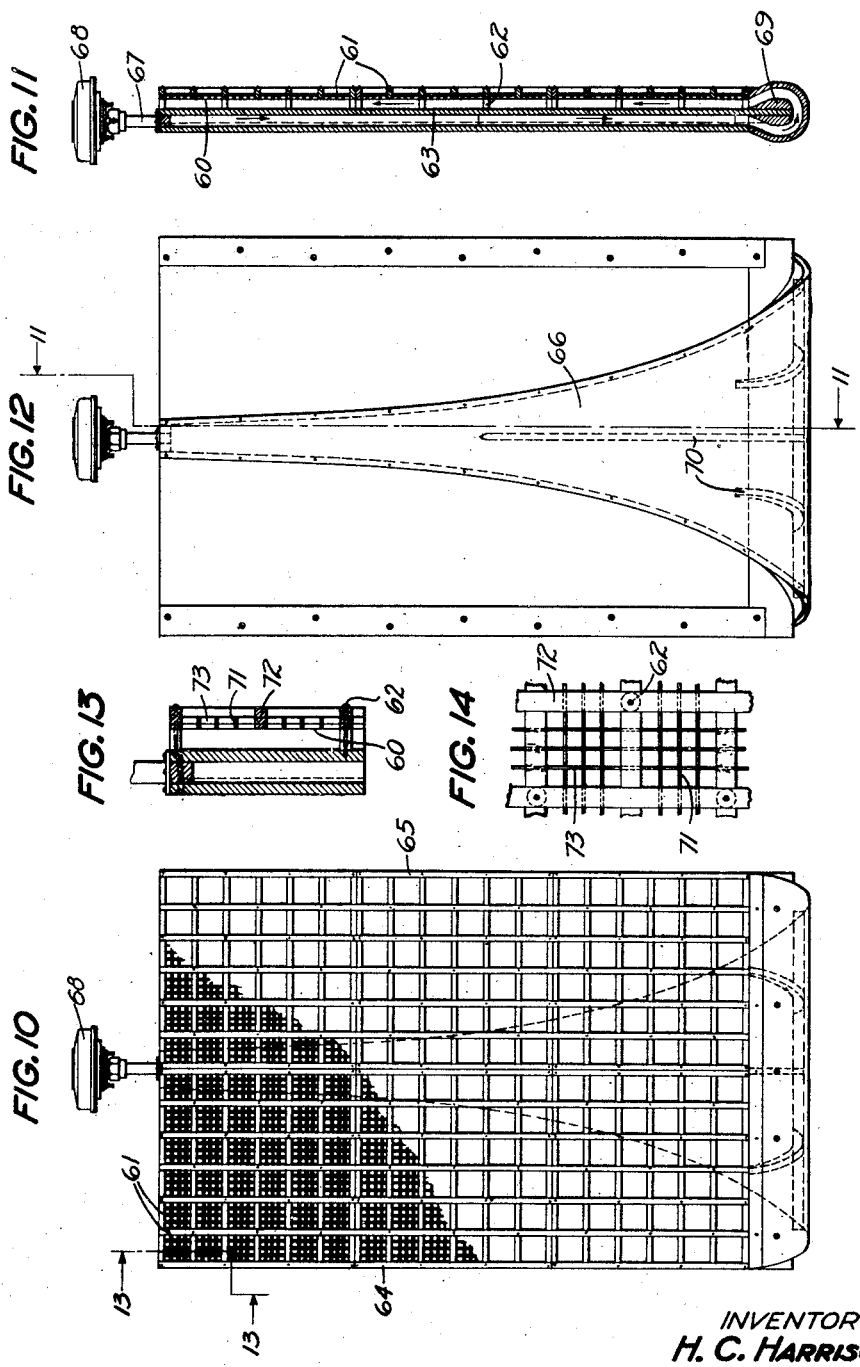

Patented Feb. 17, 1931

1,792,536

UNITED STATES PATENT OFFICE

HENRY C. HARRISON, OF PORT WASHINGTON, NEW YORK, ASSIGNOR TO BELL TELEPHONE LABORATORIES, INCORPORATED, OF NEW YORK, N. Y., A CORPORATION OF NEW YORK

SOUND RADIATOR

Application filed November 19, 1928. Serial No. 320,333.

This invention relates to sound radiation and more particularly to sound radiators of the direct acting or hornless type, in which the sound wave energy is communicated to the air through the vibrations of an extended diaphragm.

An object of the invention is to improve the response characteristic of such radiators by reducing or elminating the effects of mechanical resonance in the diaphragm. Another object is to provide an improved method of driving an extended diaphragm whereby the driving force is applied over the greater part of the diaphragm surface.

Sound reproducers embodying the invention take the general form of a sound conduit having a yielding wall of light elastic material, such as wood veneer or thin metallic foil. Sound waves are impressed on one end of the conduit by means of a telephone receiver or other suitable translating device, and as they traverse the conduit their energy is communicated to the elastic wall and is radiated to the air. The arrangement may be compared to an elastic transmission line. The acoustic channel constitutes the main transmission path, and the yielding wall is analogous to an added shunt admittance of distributed and partially dissipative character. By extending the length of the channel the absorption of energy by the side walls may be made so complete that practically all of the energy is taken out of the wave before it reaches the end. Under these conditions wave-reflection in the channel is negligible, and the device presents a substantially uniform resistive load impedance to the telephone receiver at all frequencies. The sound wave conduit may be formed in various manners, or a plurality of inter-connected conduits may be combined together so that the elastic walls may present a large radiating surface suitable for radiating waves of the lowest frequencies.

To secure the most uniform response of the device as a whole at all frequencies it is desirable that the radiating wall of the sound conduit, or any part of it, should be free from resonance at the frequency of any wave to which it is subjected. This implies that the wall should be light and relatively rigid at all points. It is necessary, however, that the wall should yield rather readily under the pressure of the impressed waves, and for this reason should be fairly flexible. It has been found that these apparently conflicting requirements can be met satisfactorily by making walls of very light elastic material such as balsa wood or corrugated metallic foil or stretched paper, and supporting the surface at a large number of points so that the lengths of the unsupported portions are kept small. In the case of a stretched membrane, as the separation of the supporting points is reduced the resonance frequency of the unsupported surfaces increases much more rapidly than the stiffness, with the result that a satisfactory degree of flexibility can be obtained consistent with a resonance frequency well above 5000 c. p. s. Where unstretched membranes are used, the thickness of material must be reduced coincident with the reduction in the separation of supports to effect the same result.

It is furthermore important that there should be no appreciable transmission of waves mechanically by the radiating wall, otherwise complications would arise from wave interferences due to the fact that waves are propagated in air at a different velocity than in the membrane material. Since points on the radiating wall equi-distant from the sound source are at approximately the same pressure, there is little tendency for mechanical wave transmission in the transverse direction through these points. The pressure, however, at different points on the radiating wall in the direction of wave propagation, that is, longitudinally along the channel, is not the same; hence there is a tendency for mechanical propagation in the membrane in a longitudinal direction. The mechanical propagation resulting from this tendency can be minimized by supporting the surface at a large number of points as mentioned above or by using a membrane material of a nature or form that does not readily lend itself to mechanical propagation.

It is characteristic of sound radiators embodying the invention that the reaction of the vibrating wall is of an elastic type, as distinguished from an inertia type, at all frequencies of the speech range. In consequence of this the energy of high frequency waves is readily absorbed by the walls and is radiated in a very short length of the channel, while low frequency waves require greater lengths for the absorption of the energy. The active radiation surface for short waves is therefore relatively small whereas the whole extended area of the vibrating wall is utilized for the radiation of low frequency waves.

The nature of the invention and the manner in which it may be carried out will be more fully understood from the following detailed description, with reference to the attached drawings, of which:

Figs. 1 and 2 are front and end views respectively of one form of the invention;

Figs. 3, 4 and 5 are front, side and end views respectively of another form of the invention;

Figure 15:
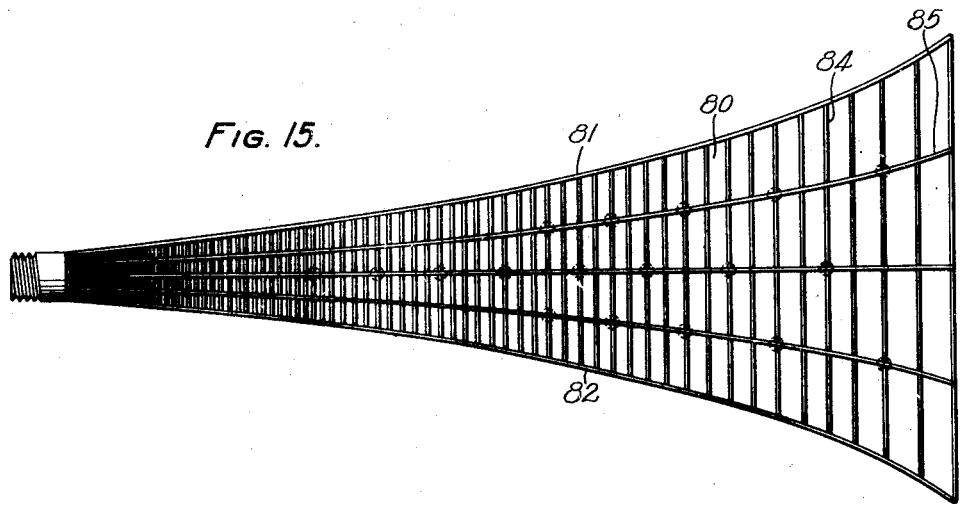
Figure 16:
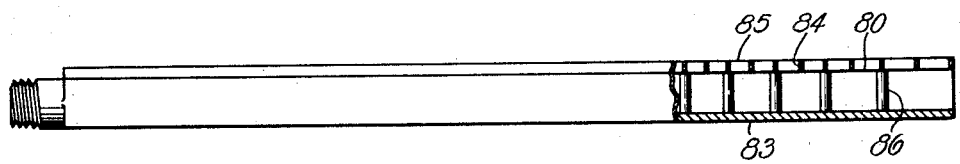

Figs. 10, 11 and 12 illustrate a form of the invention used in connection with a tapered channel, details being shown in Figs. 13 and 14; and Figs. 15 and 16 illustrate a modified form of the invention more particularly adapted for securing a strong response to low frequency tones.

In the device of Fig. 1 an acoustic channel 20 is formed by a pair of divergent walls 21 and 22, and a pair of parallel walls 23 and 24, the cross section of the channel at any point being rectangular in shape and relatively narrow. At the throat end, a threaded fitting 25 is provided for connecting with a loud speaker unit. The mouth end 26 may open directly into the air or may be closed. The three walls 21, 22 and 23 are of rigid construction, while the front wall 24, which constitutes the radiating member, may be made of a light elastic material, such as paper or balsa wood, or of a thin foil of resilient metal such as aluminum. Located within the channel are numerous struts 27 extending from the unyielding wall 23 to the elastic wall 24 and firmly fastened to both by a suitable cement, or by other means. Acoustic waves produced by the diaphragm of the loud speaker are propagated along the channel, causing the elastic wall 24 to vibrate accordingly, and thus to act as a diaphragm from which the sound waves are radiated to the outer air. To avoid the condition of resonance in the ordinary range of voice and musical frequencies, the mass of the diaphragm is made small and the stiffness moderately large. The materials mentioned above enable these requirements to be met. It is important, however, that the diaphragm should not be made too rigid, otherwise its response to the driving force of the air waves in the conduit will be too small to be of practical use. To secure the desirable feature of a high resonant frequency, combined with a sufficient low stiffness the struts 27 are used, their purpose being to break up the surface into small elements. The resonant frequency of the portions of the diaphragm between the struts can be increased simply by decreasing the spacing between the struts, and it is found that this can be done without greatly increasing the stiffness of the walls. Another useful function served by the struts is to prevent the transmission of vibrations mechanically along the membrane. To make the radiator surface large, whereby it may be effective at low frequencies, the cross-sectional area of the channel is expanded from a small value at the loud speaker where the acoustic pressure is high and the impedance low, to a large value at the mouth where the impedance becomes high. To effect this change in impedance without wave reflections within the channel, the progressive wave front areas may be made to change in accordance with an exponential law, which may be accomplished by causing the walls 21 and 22 to converge in accordance with an exponential law. A length of about 6 ft. for the channel has been found satisfactory for transferring most of the sound energy to the diaphragm.

Another form of the invention is illustrated in Figs. 3, 4 and 5. A sound channel 31 is formed by two pairs of approximately parallel walls 30, 33 and 32, 34, so that the channel has a constant cross-section which is very nearly rectangular. The walls 32, 33 and 34 are of a rigid material, while the wall 30, rectangular in shape, is composed of a yielding material of a light rigid substance such as paper or balsa wood, fastened to a number of parallel supports 35 running lengthwise of the channel, dividing it into a plurality of parallel conduits. The yielding wall may be composed of a single piece of yielding material or of a plurality of strips having a width about equal to the separation of the supports 35 to which they are fastened. A length of about 6 ft., a breadth of 4 ft., and a space of about 1 inch between the yielding wall 30 and the back wall 33 have been found to be satisfactory dimensions for this type of radiator. To effect a satisfactory coupling between the radiator and a loud speaker unit, a tapered coupling channel 36 is employed. This may be of any convenient form so long as its cross-section at the mouth is equal to that of the radiator, and at the throat, to that of the loud speaker unit which may be attached to a threaded fitting 37. In Fig. 5, the end view, is shown the method in which strips 38 of balsa wood may be applied to constitute the yielding wall. The strips, which should have a thickness of about one-sixteenth of an inch or less, are curved outward from the supports for the purpose of obtaining a moderate amount of stiffness which can be increased or decreased by increasing or decreasing the degree of curving. In using the balsa wood it is preferable to have the grain run crosswise of the channel, for then, mechanical vibrations are not readily transmitted across the grain in a direction lengthwise along the channel, which, as before mentioned, would be undesirable. The purpose of using the supporting strips 35 is to decrease the separation between the supports for the diaphragm material in a cross-wise direction, to the point where the natural resonance is sufficiently high. The natural resonance is further adjustable by the choice of material for the yielding wall by virtue of its properties of weight and stiffness.

Figure 6:
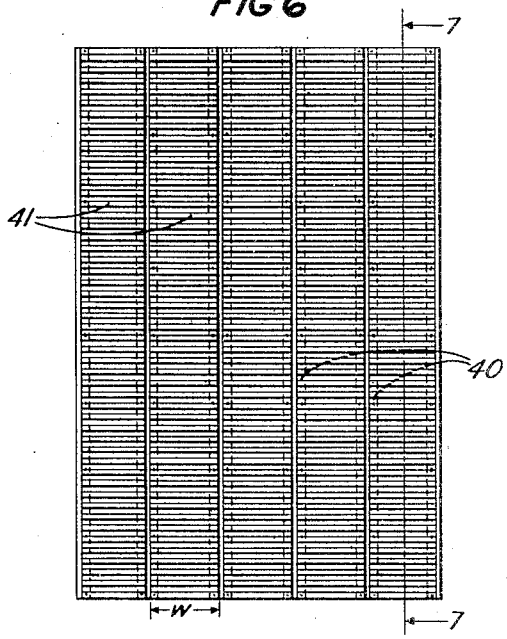
Figs. 6, 7, 8 and 9 illustrate modifications of the form shown in Figs. 3 and 4.
Figure 7:

A variation of the rectangular type of radiator is shown in Figs. 6 and 7. The device has the same general shape including the longitudinal supports 40, but instead of strips of balsa wood or paper for a yielding membrane, strips of light corrugated metallic foil or aluminum are used. These strips 41 have width $w$, between the longitudinal supports to which they are attached by screws or other means. It is characteristic of these strips that the stiffness crosswise, that is, along the corrugations, is relatively great, while lengthwise across the corrugations, it is small, so that mechanical vibrations are readily transmitted crosswise but not lengthwise. The resonant frequency of this type of yielding wall may be controlled by adjusting the depth and number of corrugations, the weight of the material, and the spacing between the supports. A foil of thickness of about .002 inch and corrugated with about 20 corrugations to the inch has been found suitable for the purpose. Coupling to the driving element may be effected in the same manner as in the device of Fig. 3.

Figure 8:
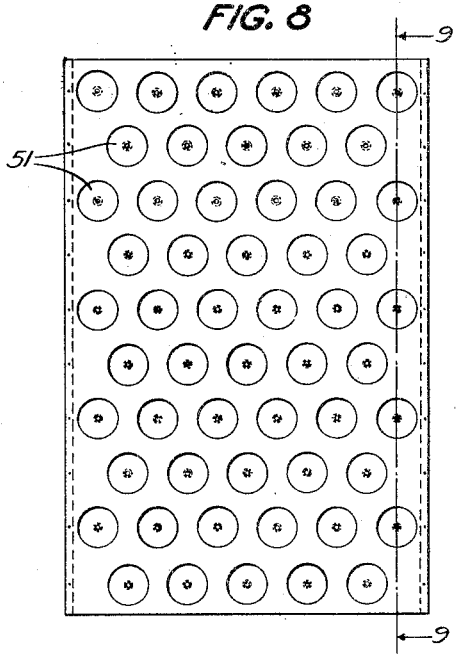
Figure 9:
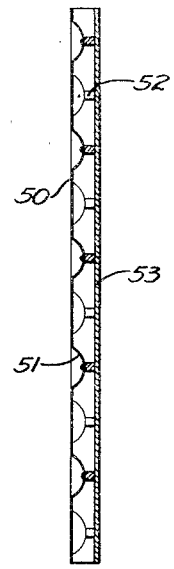

Another variation of the same type of radiator is shown in Figs. 8 and 9. The radiating surface 50 consists of a single thin sheet of a light metal, such as aluminum, having a multitude of depressions 51 which may conveniently be spherical in form. A strut 52 of circular cross-section extends from the back wall 53 of the acoustic channel to the center of each depression and is firmly secured thereto. A screw running through each diaphragm depression and through a concentric hole in its strut to the rear wall 53 is a satisfactory fastening. This construction is another means for causing the diaphragm to be resonant above the ordinary voice frequency range; for the stiffness of the depressed portions is quite large, so that the resonant frequency can be controlled by varying the number and size of the depressions made per unit area. The plurality of struts serves to localize mechanical transmission in the membrane in a manner similar to that of the radiator in Figs. 1, 2, and 3.

Figs. 10 to 14, inclusive, illustrate a construction that is particularly adapted for the use of paper as a membrane material. Fig. 10 is a front view showing the radiator; Fig. 11 is a side view in section along the line 11, 11 of Fig. 12 which is a rear view showing the transforming device. The diaphragm 60 consists of a single piece of stretched material, preferably paper, and is fastened onto a framework 61 which may be of wood assembled so that it provides a multitude of small rectangular apertures. A suitable diaphragm material consists of one-half mil condenser paper glued to the framework and then treated with a weak solution of cellulose nitrate in amyl-acetate, which upon drying causes the paper to be stretched. Supporting the wooden framework are numerous struts 62, extending to the framework from the back piece 63. The back piece 63, the membrane 60 and the two sides 64 and 65 form the walls of the acoustic channel. On the back of the rigid wall 63 is a tapered channel 66 formed by unyielding walls having a depth equal to that of the radiator channel, which may conveniently be about one inch. To the throat end of the tapered channel is attached a coupling 67 for connecting a loud speaking unit 68. The transverse areas of the tapered channel progressively increase downward until at the bottom the area equals the cross-section of the radiator channel transverse to the direction of wave motion. At the bottom the tapered channel is turned around the formed portion 69 attached to the back piece 63, and joins the lower end of the radiating channel. The upper end of the radiator channel is shown open, but it may be closed if desired. In Fig. 12 there are shown supports 70 in the tapered channel for the purpose of lending rigidity to the walls of the tapered channel to prevent resonance within the musical range of frequency.

Fig. 13 is a view in section taken along the line 13, 13 of Fig. 10 to show more clearly the construction of the framework for holding the membrane, and Fig. 14 is a detailed front view of a portion of the frame. The membrane is fixed to the pieces 71 and 72 but not to the longitudinal pieces 73, the result being that the entire diaphragm consists of a plurality of rectangular sections with the long dimensions crosswise to the direction of sound propagation. This construction allows considerable amplitude of vibration in the membrane, but prevents mechanical wave transmission in the direction of the acoustic channels. A feature of the stretched membrane is that its stiffness is independent of the size of the rectangles. In consequence the resonant frequency may be increased by reducing the size of the rectangles, while the stiffness remains constant. This affords a convenient method of assigning a desirable stiffness and at the same time regulating the resonant frequency.

Figs. 15 and 16 illustrate a radiator which can be made to give a relatively greater response to low frequency waves than the radiators previously described. This is accomplished by constructing the diaphragm or membrane in sections which increase in size towards the remote or mouth end of the radiator channel. The radiator shown is somewhat similar in shape to that shown in Figs. 1 and 2. The walls 81, 82 and 83 are rigid, while the wall 80 is a diaphragm of yielding vibratory material, such as stretched paper. The diaphragm is fixed to a framework consisting of cross strips 84 and longitudinal strips 85, held in place by struts 86, so that the entire radiating surface consists of approximately rectangular sections progressively becoming larger toward the mouth end of the channel. The larger sections at the mouth vibrate with greater amplitude under a given stimulus than the smaller sections nearer the entrance or throat. The resonance frequencies of the sections near the mouth are lower than those of the sections nearer the throat owing to the increased mass and decreased elastance of the larger sections, but the waves of higher frequency are almost entirely absorbed and radiated before they have traveled far from the throat, so that only waves of the lower frequencies are present near the mouth. In consequence of this, the waves of lower frequency may be radiated with greater energy than would be the case if the rectangular sections of the diaphragm were all uniformly small.

What is claimed is:

1. A sound radiator comprising means defining an extended acoustic channel, said means including a resilient wall of light material, the mass per unit area of sections of said wall being so small that the inertia reaction in transverse vibration of said sections is negligibly small in comparison with the elastic reaction at all important frequencies of speech and music.

2. A sound radiator comprising means defining an extended acoustic channel, said means including a resilient wall of light material, the mass per unit area of sections of said wall being so small and the rigidity to transverse bending being so great that the reactance of said sections in transverse vibration is substantially free from inertia at all important frequencies of speech and music.

3. A sound radiator comprising an extended diaphragm of light elastic material, means defining an acoustic channel on one side of said diaphragm, and closely spaced supporting means for supporting the surface of said diaphragm, whereby resonance of the portions of said diaphragm between said supporting means at a frequency within the important range of speech or music is prevented.

4. A sound radiator in accordance with claim 3 in which the supporting means comprises a plurality of struts arranged in a staggered array in the acoustic channel.

5. A sound radiating system comprising an extended diaphragm of light elastic material, means defining an extended acoustic channel traversing one side of said diaphragm, means for supporting the surface of the diaphragm from the walls of the channel, and means for impressing sound waves at one end of said channel, the thickness of the diaphragm and the separation of said supporting means being so proportioned with respect to the elasticity and density of the material that at least part of the diaphragm is free from resonance to sound waves traversing said channel within the important range of speech or music.

6. A sound radiator comprising a four-walled acoustic channel, two of the walls being closely spaced, one of said closely spaced walls comprising a light resilient material resonant above the ordinary range of speech and music.

7. A sound radiator comprising a four-walled acoustic channel, two of the walls being parallel and closely spaced, the other two being tapered with respect to each other, one of the parallel walls comprising a resilient light material resonant above the ordinary range of speech and music.

8. A sound radiator comprising means defining an acoustic channel, the depth of which is small compared to its width, said means including a resilient wall so light and so stiff that it is resonant above the ordinary range of speech and music.

9. A sound radiator comprising means defining an acoustic channel, said means including a wall of stretched resilient material supported by a frame-work, said frame-work being so assembled that the portions of the framework constraining said resilient material have substantially the form of a plurality of rectangles.

10. A sound radiator comprising means defining an acoustic channel, said means including a wall of yielding resilient material supported by a framework, said framework being so assembled with respect to said wall that said wall comprises a plurality of sections constrained by said framework, the sizes of the sections progressively increasing toward the outer end of said channel.

11. A sound radiator in accordance with claim 10 in which each section of the resilient wall has a resonant frequency higher than the frequency of any sound wave of appreciable magnitude transmitted to it from within the acoustic channel.

12. A sound radiator in accordance with claim 10 in which the sections of the yielding resilient wall formed by the framework are approximately rectangular in shape.

13. A sound radiator according to claim 10, in which the sections near the outer end of said channel are resonant within the important speech and musical frequency range and the sections near the opposite end of said channels are resonant above the important speech and musical frequency range.

14. A sound radiator according to claim 10, in which the stiffness of the resilient wall progressively decreases toward the outer end of said channel.

15. A sound radiator in accordance with claim 3, in which the diaphragm is composed of thin metallic foil and is formed to increase its stiffness in the direction transverse to the acoustic channel.

16. A sound radiator comprising a plurality of extended acoustic channels whereby a large radiating surface is obtained, each of said channels including a resilient wall of light material having a natural period of resonance above the frequency range of speech and music.

17. A sound radiator in accordance with claim 16 in which the resilient walls consist of light corrugated metal, the corrugations running cross-wise to the direction of wave propagation in the channel.

18. A sound radiator in accordance with claim 16 in which the resilient walls consist of curved strips of balsa wood.

19. A device for radiating sound waves comprising in combination, a sound radiator comprising means defining an acoustic channel, said means including a resilient wall having a resonant frequency above the ordinary range of speech and music, and an acoustic impedance transforming device comprising a tapered acoustic channel, the larger opening of which connects with one end of the channel of said sound radiator.

In witness whereof, I hereunto subscribe my name this 16th day of November, 1928.

HENRY C. HARRISON.